US008919511B2

(12) United States Patent
Chu et al.

(10) Patent No.: US 8,919,511 B2
(45) Date of Patent: Dec. 30, 2014

(54) STARTER MOTOR AND ONE WAY CLUTCH

(75) Inventors: Jun Jie Chu, Hong Kong (CN); Xiao Bing Zuo, Shenzhen (CN)

(73) Assignee: Johnson Electrics S.A., Murten (CH)

( * ) Notice: Subject to any disclaimer, the term of this patent is extended or adjusted under 35 U.S.C. 154(b) by 408 days.

(21) Appl. No.: 13/287,585

(22) Filed: Nov. 2, 2011

(65) Prior Publication Data

US 2012/0103744 A1 May 3, 2012

(30) Foreign Application Priority Data

Nov. 2, 2010 (CN) .......................... 2010 1 0532326
May 10, 2011 (CN) .......................... 2011 1 0137304

(51) Int. Cl.
*F16D 13/04* (2006.01)
*F02N 15/06* (2006.01)
*F02N 15/02* (2006.01)

(52) U.S. Cl.
CPC ............ *F02N 15/023* (2013.01); *F02N 15/063* (2013.01)
USPC ............................................................ 192/42

(58) Field of Classification Search
USPC ...... 192/42, 45, 38, 44, 103 R, 104 R, 105 R, 192/104 B, 104 C, 106 R, 45.004, 46, 41 S; 188/82.84; 74/6, 7 C
See application file for complete search history.

(56) References Cited

U.S. PATENT DOCUMENTS 6,044,945 A * 4/2000 Muramatsu .............. 192/45.011
6,116,024 A * 9/2000 Rottino ........................... 60/345
6,338,402 B1 * 1/2002 Muramatsu et al. ...... 192/45.011
6,796,413 B2 * 9/2004 Fukui et al. ...................... 192/42
6,920,969 B2 * 7/2005 Ishizaka et al. ............ 192/45.02
7,040,469 B2 * 5/2006 Shirataki et al. ......... 192/45.011
2011/0088988 A1 * 4/2011 Sakai et al. ..................... 192/45

FOREIGN PATENT DOCUMENTS

JP 63005160 A 1/1988

* cited by examiner

*Primary Examiner* — Saul Rodriguez
*Assistant Examiner* — David J Hlavka
(74) *Attorney, Agent, or Firm* — Muncy, Geissler, Olds & Lowe, P.C.

(57) ABSTRACT

A starter motor includes an electric motor, a drive shaft driven by the motor and an inertia drive pinion which includes a driver in threaded engagement with the drive shaft, a pinion shaft rotatably sleeved on the drive shaft, an output pinion being able to rotate with the pinion shaft, and a one way clutch. At least one elastic member is arranged between the output pinion and the pinion shaft in the axial direction to resiliently support the output pinion to move along the pinion shaft. A one way clutch especially suitable for the starter motor was also disclosed.

7 Claims, 5 Drawing Sheets

STARTER MOTOR AND ONE WAY CLUTCH

CROSS REFERENCE TO RELATED APPLICATIONS

This non-provisional patent application claims priorities under 35 U.S.C. §119(a) from Patent Application No. 201010532326.0 filed in The People's Republic of China on Nov. 2, 2010 and Patent Application No. 201110137304.9 filed in The People's Republic of China on May 10, 2011.

FIELD OF THE INVENTION

This invention relates to an inertia starter motor for an internal combustion engine and to a one way clutch for an inertia starter motor.

BACKGROUND OF THE INVENTION

Solenoid starter motors and inertia starter motors are commonly used to start internal combustion engines.

Solenoid starter motors have a solenoid which moves the drive pinion between a disengaged position and an engaged position. These type of starter motors are also known as positive displacement starters as the solenoid ensures positive movement of the pinion into engagement with the ring gear of the engine.

A traditional inertia starter has no solenoid. Instead, the drive pinion is moved by inertia at the time the starter motor is turned on. The drive pinion has an output pinion for engaging the ring gear of the internal combustion engine, and a driver which is mounted on a drive shaft driven by the motor. The driver engages with a helical spline formed on the drive shaft so as to move axially along the drive shaft when the driver rotates about the drive shaft. When the motor starts, the inertia of the drive pinion initially prevents the driver from rotating with the drive shaft and hence the drive pinion is moved axially along the drive shaft and into engagement with the ring gear at which time further axial movement is restricted and the drive pinion rotates with the drive shaft. A one way clutch, also known as an overrunning clutch, may be provided to transmit the torque from the driver to the output pinion and to disengage the driver from the output pinion when the output pinion rotates faster than the driver.

Compared with solenoid starters, inertia starters apply a greater shock load to teeth of the pinion and the ring gear when the output pinion engages with the ring gear, which causes wear of the pinion and the ring gear, sometimes even causing the pinion to become jammed with the ring gear if the engagement between the pinion and the ring gear is not well matched. It is desired to solve the above problem.

SUMMARY OF THE INVENTION

Accordingly, in one aspect thereof, the present invention provides a one way clutch comprising: an inner ring with an outer cylindrical surface; an outer ring having a plurality of teeth inwardly extending from an inner surface thereof, each tooth having a first supporting surface, the inner surface of the outer ring between each pair of adjacent teeth forms a second supporting surface adjacent to the first supporting surface and a slanting surface; and a plurality of holders, each of which is supported by a pair of adjacent first and second supporting surfaces and supports an elastic member which resiliently supports a roller to travel in a gap between the outer cylindrical surface and the corresponding slanting surface, radial width of the gap gradually reducing in the direction away from the holder; wherein each holder has a projection disposed into a respective concaved part formed in one of the first supporting surface and the second supporting surface.

Preferably, the first supporting surface and the second supporting surface form an angle of less than 90 degrees.

Preferably, each concave part is an axially extending groove and the projection is an axially projected strip disposed in a respective one of the axially extending grooves.

Preferably, each holder has a pair of side protrusions distributed in the axial direction and a middle protrusion between the pair of side protrusions, and the elastic member is a compression spring sleeved on the middle protrusion.

Preferably, the outer diameter of the compression spring is substantially equal to the axial distance between the pair of side protrusions.

Preferably, the projection forms a bridge connecting the pair of side protrusions.

Preferably, each side protrusion has a concaved arcuate surface matching an outer surface of the roller.

According to a second aspect thereof, the present invention provides a starter motor comprising an electric motor, a drive shaft driven by the motor and an inertia drive pinion, the inertia drive pinion comprising: a driver in threaded engagement with the drive shaft; a pinion shaft rotatably sleeved on the drive shaft; an output pinion slidably sleeved on the pinion shaft and arranged to rotate with the pinion shaft; and a single direction transmission for transmitting torque from the driver to the pinion shaft and disengaging the driver from the pinion shaft when the pinion shaft rotates faster than the driver; wherein at least one elastic member is arranged between the output pinion and the pinion shaft in the axial direction to resiliently support the output pinion to move along the pinion shaft.

Preferably, the elastic member is a compression spring sleeved on the pinion shaft and supported by the output pinion and the pinion shaft in the axial direction.

Alternatively, the elastic member is an elastic gasket fixed to one of the output pinion and the pinion shaft.

Preferably, the drive pinion further includes a sleeve member which holds the driver and the pinion shaft together in the axial direction.

Preferably, the elastic member is supported by a surface of the sleeve member facing the output pinion.

Preferably, the driver and the pinion shaft has a narrow tubular portion and a wide tubular portion, the wide tubular portion of the pinion shaft is coaxially arranged inside the wide tubular portion of the driver, and the single direction transmission is arranged between the two wide tubular portions.

Preferably, the single direction transmission is a one way clutch as described above.

In the embodiments of the present invention, the elastic member arranged between the output pinion and the pinion shaft is able to absorb the shock loading applied to the teeth of the output pinion and the ring gear, which is helpful to reduce the wear on the output pinion and the ring gear and reduces the likelihood of the output pinion jamming with the ring gear, therefore reliability and durability of the drive pinion can be improved. Furthermore, excessive shaking of the compression springs resiliently supporting the rollers is avoided, which prevents one end of the compression springs contacting the rollers from slipping off or wearing, thereby improving the reliability of the one way clutch.

BRIEF DESCRIPTION OF THE DRAWINGS

Two preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
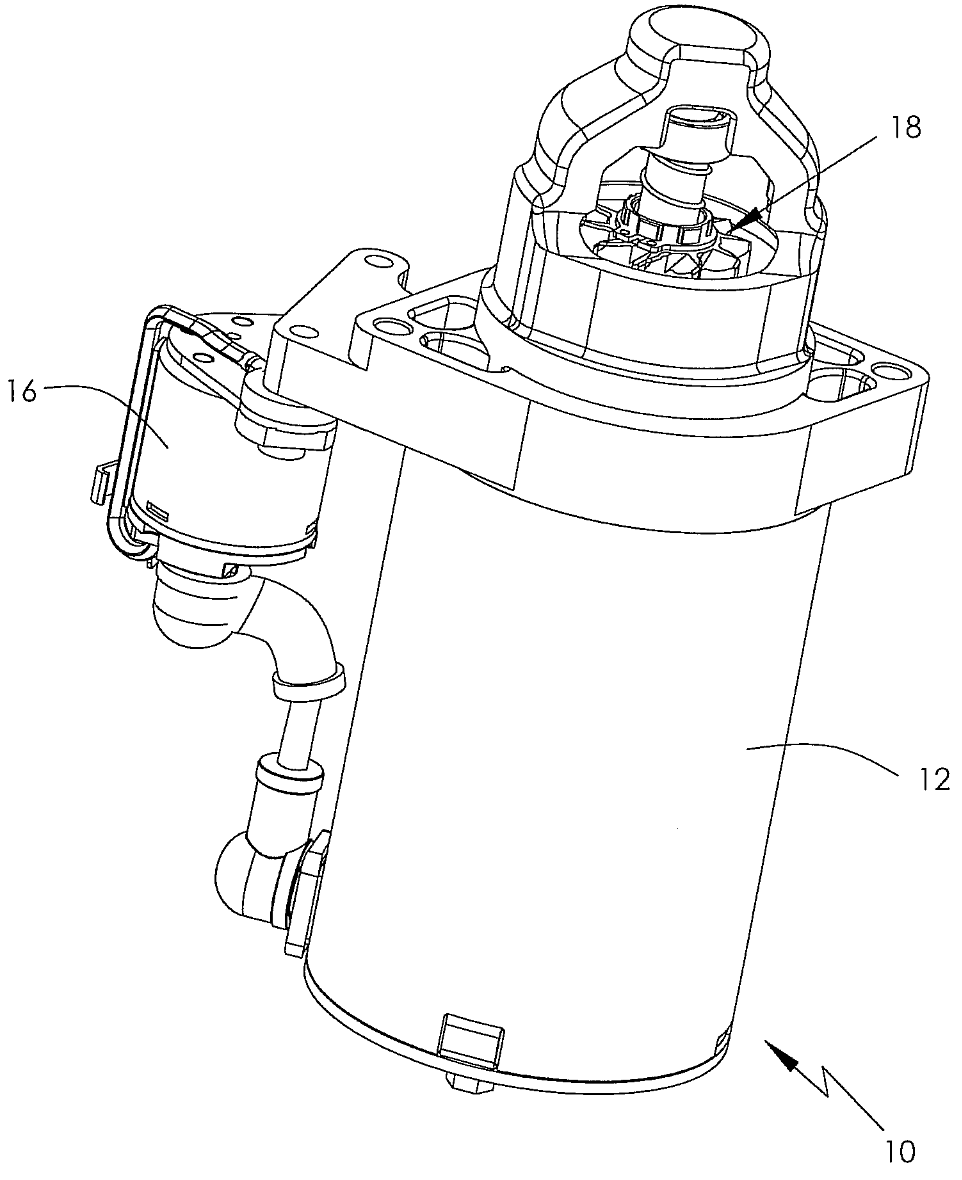
FIG. 1 is a view of a starter motor in accordance with a preferred embodiment of the present invention.
Figure 2:
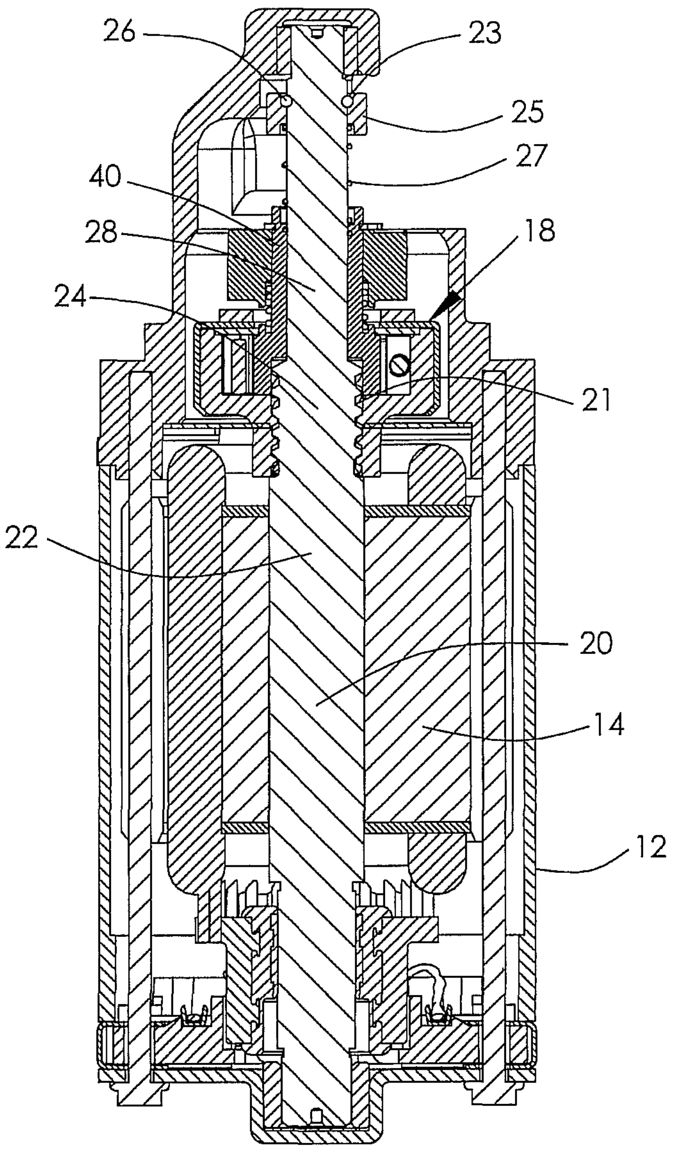
FIG. 2 is a sectional view of the starter motor of FIG. 1.

Referring to FIGS. 1 to 4, a starter motor 10 in accordance with a preferred embodiment of the present invention includes a housing 12, an electric motor 14 disposed in the housing 12, a relay switch 16 electrically connected between the motor 14 and a power supply, a drive shaft 20 driven by the motor 14, and an inertia drive pinion 18 driven by the drive shaft 20. In this embodiment, the drive shaft 20 is the shaft of the motor.

Figure 3:
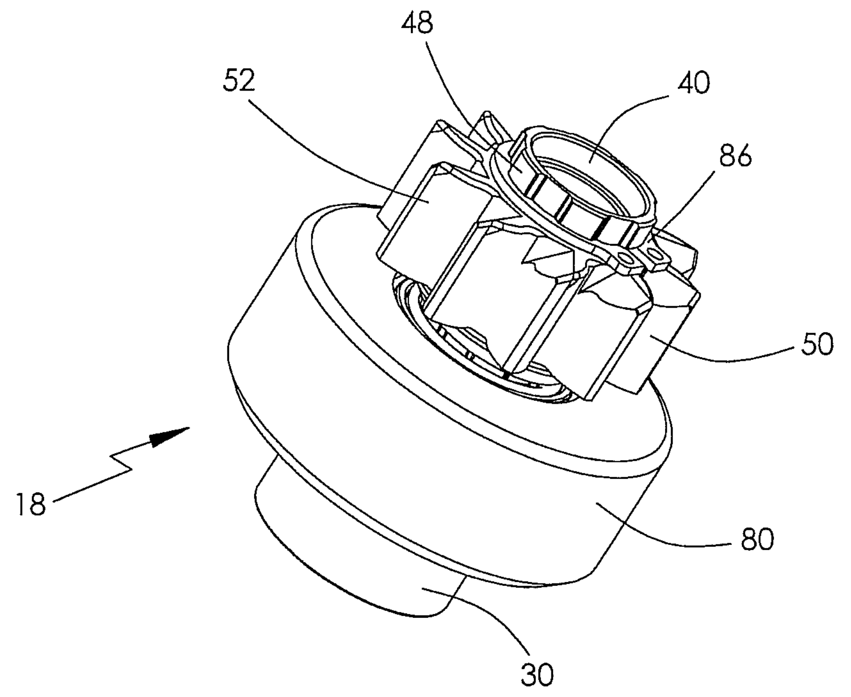
FIG. 3 is a view of a drive pinion being a part of the starter motor of FIG. 1.
Figure 4:
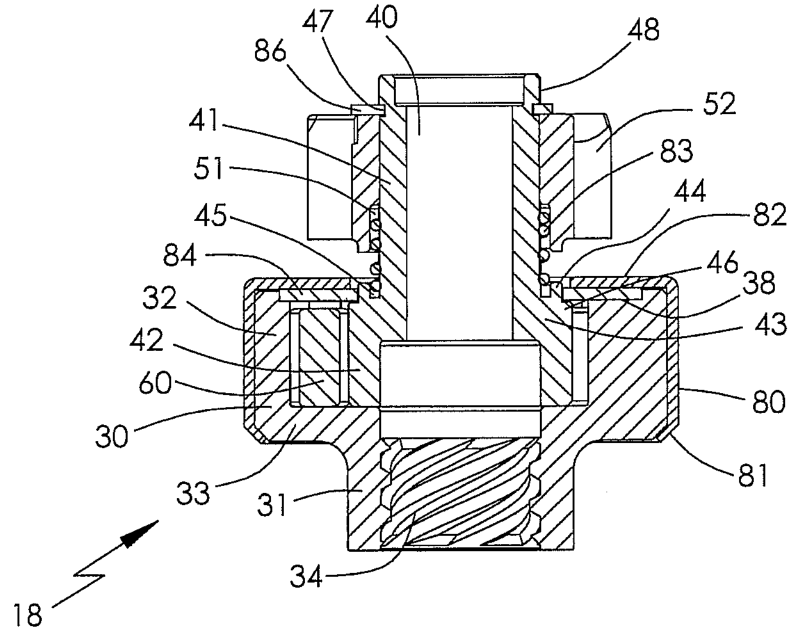
FIG. 4 is a sectional view of the drive pinion of FIG. 3.

The inertia drive pinion 18, shown in more detail in FIGS. 3 & 4, includes a driver 30 and a pinion shaft 40 which are sleeved on the drive shaft 20, an output pinion 50 mounted on the pinion shaft 40, a one way clutch 60 between the driver 30 and the pinion shaft 40, and a sleeve member 80. As mentioned above, the one way clutch is also known as an overrunning clutch.

The drive shaft 20 has a driving portion 24 with outer helical splines 21 on its outer surface, a first portion 28 at one end of the driving portion 24 adjacent to the output pinion 50 and a second portion 22 at the other end of the driving portion 24 remote from the output pinion 50. The first portion 28 and the second portion 22 have no helical splines formed. The first portion 28 has an outer diameter smaller than the helical splines 21. The second portion 22 has an outer diameter greater than the helical splines 21 so as to limit the axial travel of the driver 30. A circumferential slot 23 is formed at one end of the drive shaft 20 adjacent the output pinion 50. A stopper 25 is assembled to the drive shaft 20 by a ring member 26 locked in the circumferential slot 23 to limit the axial travel of the pinion shaft 40. A compression spring 27 sleeved or otherwise disposed around the drive shaft 20, is held between the stopper 25 and the pinion shaft 40.

The driver 30 has a first narrow tubular portion 31 mounted on and in threaded engagement with the helical splines of the drive shaft 20 and a first wide tubular portion 32 connected to the narrow tubular portion 31 via a disk portion 33. The narrow tubular portion 31 has inner helical splines 34 to match the outer helical splines 21 of the drive shaft 20. Preferably, the helical splines 21, 34 have a pitch angle of between 60 and 70 degrees.

The pinion shaft 40 has a second narrow tubular portion 41 and a second wide tubular portion 42 connected to the narrow tubular portion 41 via a connecting portion 43. The second narrow tubular portion 41 is rotatably sleeved on the first portion 28 of the drive shaft 20 and has axially extending ridges 48 formed on the outer surface thereof. The second wide tubular portion 42 is coaxially arranged inside the first wide tubular portion 32. The inner diameter of the second wide tubular portion 42 is slightly greater than the outer diameter of the outer helical splines 21 to accommodate the driving portion 24 without engagement. An annular protrusion 44 extends axially from one end surface of the connecting portion 43 facing the output pinion 50. The annular protrusion 44, the second narrow tubular portion 41 and the connecting portion 43 form an annular slot defining a spring supporting structure 45 for receiving an end of a compression spring 83.

Two annular shoulders 38 and 46 are respectively formed in two adjacent axial end surfaces of the two wide tubular portions 32 and 42. A ring disk 84 is positioned between the two wide tubular portions 32 and 42 and supported by the two annular shoulders 38 and 46. Therefore the second wide tubular portion 42 is located between the ring disk 84 and the disk portion 33 in the axial direction. The sleeve member 80 is mounted on the outer peripheral surface of the first wide tubular portion 32. The ring disk 84 and the driver 30 are held together by a pair of clamping portions 81 and 82 of the sleeve member 80 to limit the relative movement of the pinion shaft 40 and the driver 30 in the axial direction. Preferably, the sleeve member 80 is made of metal.

The output pinion 50 has a plurality of teeth 52 formed on the outer peripheral surface thereof to mesh with a ring gear of an internal combustion engine which is not shown in the figures. The output pinion 50 is sleeved on the second narrow tubular portion 41 and has a plurality of axially extending grooves formed on the inner peripheral surface thereof to match the ridges 48 on the pinion shaft 40, thus the output pinion 50 is arranged to rotate with the pinion shaft 40 but able to move axially along the pinion shaft 40. A circlip 86 fitted in a circumferential slot 47 formed in the outer surface of the second narrow tubular portion 41 at one end remote from the second wide tubular portion 42, limits the axial travel of the output pinion 50 along the pinion shaft 40. A spring supporting structure 51 is formed at one end of the output pinion 50 facing the connecting portion 43. The compression spring 83 is sleeved on the pinion shaft 50 and is hold between the output pinion 50 and the pinion shaft 40 by the two spring supporting structures 51 and 45. The compression spring 83 absorbs at least some of the shock load applied to the teeth of the output pinion 50 and the ring gear when they engage by being compressed, which is helpful to reduce the wear on the teeth of the output pinion 50 and the ring gear, therefore reliability and durability of the drive pinion can be improved.

The one way clutch 60, which is a form of a single direction transmission, is arranged between the two wide tubular portions 32 and 42 in the radial direction and between the ring disk 84 and the disk portion 33 in the axial direction. The one way clutch 60 transmits the torque from the driver 30 to the pinion shaft 40 and disengages the driver 40 from the pinion shaft 40 when the pinion shaft 40 rotates faster than the driver 40.

Figure 5:
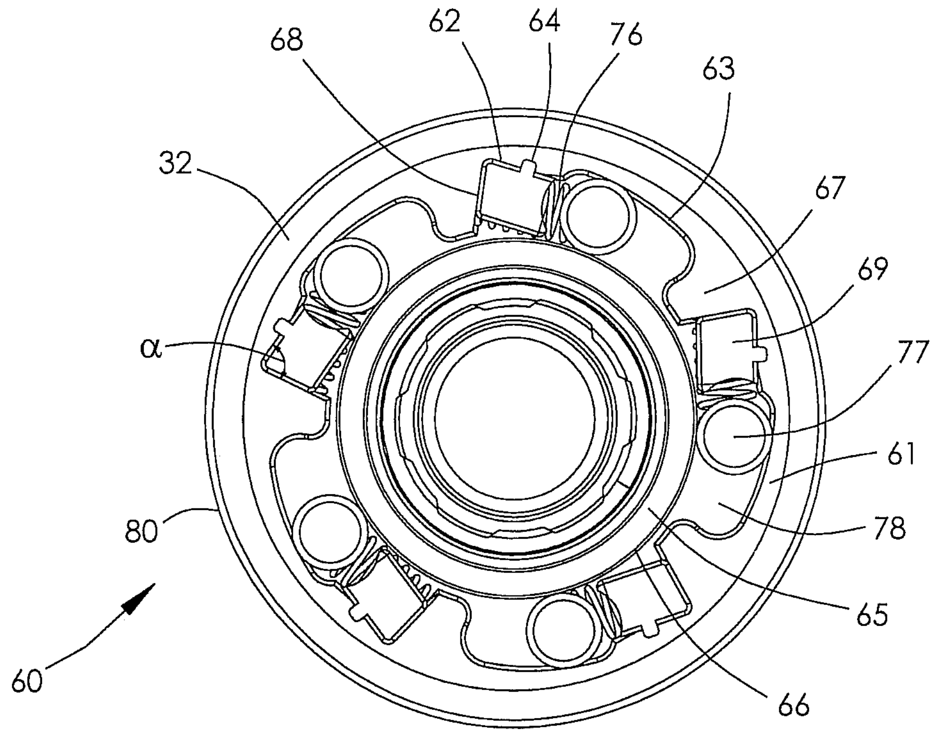
FIG. 5 is a view of a one way clutch being a part of the drive pinion of FIG. 3.
Figure 6:
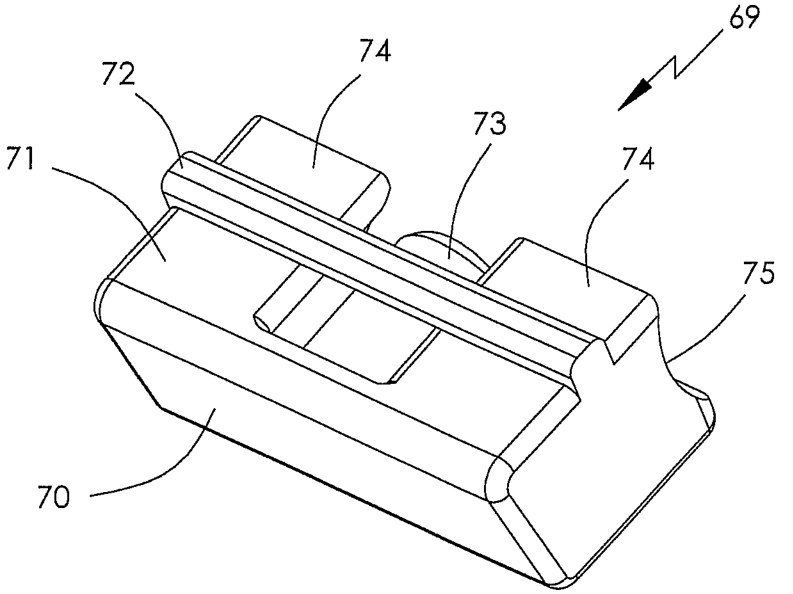
FIG. 6 is a view of a spring holder being a part of the one way clutch of FIG. 5.

The one way clutch 60, as shown in FIGS. 5 & 6, has an inner ring 65 with an outer cylindrical surface 66 and a coaxial outer ring 61. The outer ring 61 may be integrally formed with the first wide tubular portion 32 of the driver. The second wide tubular portion 42 may form the inner ring 65. The outer ring 61 has a plurality of teeth 67 extending inwardly from the inner peripheral surface thereof. The teeth 67 are uniformly distributed in the circumferential direction and are spaced from the inner ring 65. Each tooth 67 has a side surface forming a first supporting surface 68. The inner surface of the outer ring 61 between each pair of adjacent teeth 67 forms a second supporting surface 62 adjacent to the first supporting surface 68 and a slanting surface 63. Each pair of adjacent first and second supporting surfaces 68 and 62 support a spring holder 69 which supports a compression spring 76. The compression spring 76 resiliently biases a roller 77 to move in a gap 78 formed between the outer cylindrical surface 66 and the slanting surface 63. The radial width of the gap 78 gradually reduces in the direction away from the spring holder 69. Preferably, the first and the second supporting surfaces 68 and 62 form an angle a which is less than 90 degrees.

The spring holders 69 are preferably made of plastic and are spaced from the inner ring 65. Each spring holder 69 has a first surface 70 and a second surface 71. The first surface 70 and the second surface 71 form an angle substantially equal to the angle a and are supported by the first and the second supporting surfaces 68 and 62. A projection 72 (a projected strip extending in the axial direction in the embodiment) is formed on the second surface 71 and is inserted into a concaved part 64 (an axially extending groove in the embodiment) formed in the second supporting surface 62. By firmly positioning the spring holder 69, shaking of the compression spring 76 caused by shaking of the spring holder 69 can be avoided. Each spring holder 69 has a pair of side protrusions 74 arranged in the axial direction and a middle protrusion 73 between the pair of side protrusions 74. Each side protrusion 74 has a concaved arcuate surface 75 matching the outer arcuate surface of the roller 77. The compression spring 76 is sleeved on the middle protrusion 73. Preferably, the compression spring 76 has an outer diameter substantially equal to the axial distance between the pair of side protrusions 74 so as to be positioned in the axial direction, thus axial shaking of the compression spring 76 can be avoided. The projected strip 72 forms a bridge connecting the pair of side protrusions 74 to prevent the side protrusions 74 from deforming. In this embodiment, excessive shaking or severe vibration of the compression springs 76 resiliently supporting the rollers 77 is avoided, which prevents the end of the compression springs 76 contacting the rollers 77 from slipping off the roller or wearing on the outer cylindrical surface 66, thereby improving the reliability of the one way clutch.

Figure 7:
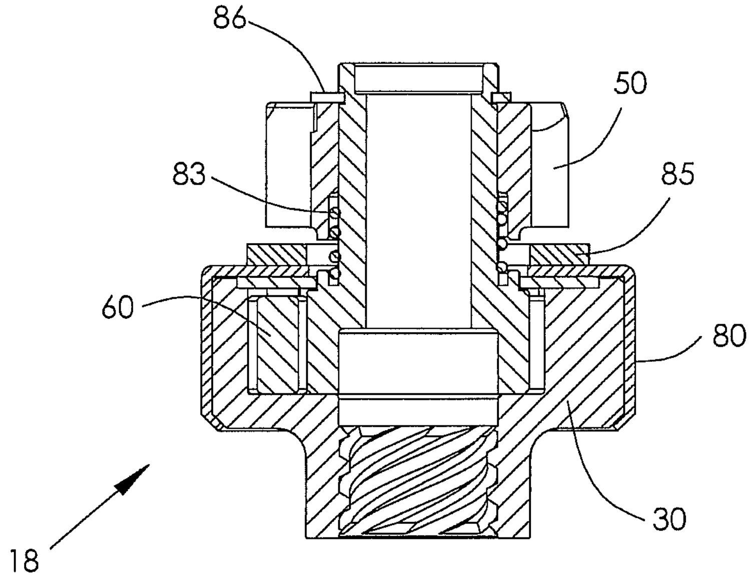
FIG. 7 is a sectional view of a drive pinion according to a second embodiment of the present invention.

FIG. 7 shows a drive pinion 18 according to a second embodiment of the present invention. The drive pinion 18 has a second elastic member 85, an elastic gasket in this embodiment, fixed on the surface of the sleeve member 80 facing the output pinion 50 to absorb the shock load. Alternatively, the second elastic member 85 may be fixed on the surface of the output pinion 50 facing the sleeve member 80.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A one way clutch comprising:

an inner ring with a radially outer cylindrical surface;

an outer ring surrounding the inner ring and having a plurality of teeth radially inwardly extending from a radially inner surface thereof, each tooth having a first supporting surface, the inner surface of the outer ring between each pair of adjacent teeth forms a second supporting surface adjacent to the first supporting surface and a slanting surface; and a plurality of holders, each of which contacts and is supported by the first supporting surface and the adjacent second supporting surface and supports an elastic member which resiliently supports a roller to travel in a gap between the outer cylindrical surface and the corresponding slanting surface, radial width of the gap gradually reducing in the direction away from the holder;

wherein each holder has a projection disposed into a respective concave part formed in either one of the first supporting surface and the second supporting surface.

2. A one way clutch according to claim 1, wherein the first supporting surface and the adjacent second supporting surface form an angle of less than 90 degrees.

3. A one way clutch according to claim 1, wherein each concave part is an axially extending groove and the projection is an axially projected strip disposed in a respective one of the axially extending grooves.

4. A one way clutch according to claim 1, wherein each holder has a pair of side protrusions distributed at two axial ends thereof and a middle protrusion between the pair of side protrusions, and the elastic member is a compression spring sleeved on the middle protrusion.

5. A one way clutch according to claim 4, wherein the compression spring abuts against the pair of side protrusions.

6. A one way clutch according to claim 4, wherein the projection is not connected to the middle protrusion and forms a bridge connecting the pair of side protrusions.

7. A one way clutch according to claim 4, wherein each side protrusion has a concave arcuate surface matching an outer surface of the roller.

* * * * *